United States Patent Office 2,954,825
Patented Oct. 4, 1960

2,954,825

WATER FLOODING PROCESS WHEREIN THICKENING AGENT FORMED IN SITU

George G. Bernard, Crystal Lake, Ill., and Nathaniel L. Remes, Miami, Fla., assignors to The Pure Oil Company, Chicago, Ill., a corporation of Ohio No Drawing. Filed Dec. 24, 1957, Ser. No. 704,886

5 Claims. (Cl. 166—9)

This invention relates to a secondary recovery process for recovering petroleum oil from subterranean geological reservoirs. It more specifically relates to improving the efficiency of a water drive employed in the secondary recovery of petroleum by water flooding.

According to this invention, the viscosity of the flood water employed as a drive fluid in a secondary recovery process is increased by forming a thickening agent in the water, in an area of the formation remote from the injection-well bore. The formation of the thickening agent is effected by incorporating an organic amine in the flood water and contacting the amine-containing flood water in the remote zone with $CO_2$ to form in situ a viscous organic carbamate solution.

In order to increase the ultimate production of petroleum oil from oil sands by recovering the residual oil remaining after the principal production has been terminated, a number of methods have been used which are, in general, categorized as secondary recovery processes. One of the more widely used secondary recovery techniques involves the injection of water as a drive fluid under pressure into the oil sands to force the residual oil therefrom.

The efficiency of water-drive, secondary recovery processes can be increased in a number of ways. In investigations of this nature, most of the effort has been directed to the use of surface-active agents as addends to the flood water. These chemical methods for increasing the efficiency of water-flood, secondary recovery processes involve modifying the interfacial tension relationships which exist between the various solid, liquid, and gas phases which exist in the rock reservoir. By reducing the interfacial tension between the liquid phases there is effected a reduction in the capillary pressure in the more minute interstitial passageways of the reservoir. Another objective of these chemical methods is to effect a preferential wetting of the solid surface to either oil or water.

Another factor which influences the efficiency of the water flooding operation is the viscosity ratio of the oil and water. In making calculations of the water-flood advance, it is assumed that no water moves ahead of the flood front and that the oil and water flow behind the flood front are governed by relative permeability-saturation relationships. It is known that this calculation depends upon the variation of the fraction of water flowing, which for a particular value of water saturation depends upon the viscosities of oil and water. The dependence of the fraction of water flowing upon viscosities means that the flood-front advance also depends upon viscosities. For example, the flood front becomes larger, that is, the water saturation at the flood bank is greater, as the ratio of the viscosity of oil to the viscosity of water decreases.

To effect a decrease in the oil-to-water viscosity ratio, it is more expeditious to adjust the viscosity of the flooding liquid. In U.S. Patent 2,341,500, a viscous liquid is introduced into the flood water to increase its viscosity. A number of thickeners, such as various soaps, water-soluble polymers such as polyvinyl and polyallyl alcohols, and non-aqueous solutions of various polymeric, organic, thickening materials, such as poly-isobutylene, nitrocellulose, cellulose nitrate, etc., can be used. While such materials, by increasing the ratio of the oil to the flooding liquid, prevent the by-passing of the flood water and affect the size of the flood bank, they thicken the flood water to such an extent that the injection rate will be substantially decreased to such an extent that the use of this expedient becomes uneconomical due to the increased power requirements necessary for introducing the flood water.

In a radial flow system, the greatest pressure drop occurs in the zone immediately adjacent the well bore which is employed as the injection well, and it is in this zone that the greatest resistance to flow is encountered. Because the flow-rate is affected by the viscosity of the flowing fluid, it is desirable that the viscosity of the fluid flowing through this zone be as low as possible to facilitate the introduction of the flooding liquid through this zone. It is, therefore, apparent that the prior art techniques which utilize a thickening agent which is per se a viscous liquid are disadvantageous because of the increased effort required to force either the thickening agent or the thickened flood water through the radial zone immediately adjacent the injection-well bore.

It is, therefore, an object of this invention to provide a method for water flooding an oil-containing reservoir by employing a flooding water whose viscosity characteristics have been substantially modified. It is another object of this invention to provide a process for recovering residual oil from subterranean reservoirs by using a flood water whose viscosity is increased in such a manner that the detrimental effect of increased viscosity on the water injection rate is minimized. It is another object of this invention to lower the oil-to-water viscosity ratio in a water-flooding process for recovering crude oil from a rock reservoir by increasing the viscosity of the water. These and other objects will become more apparent from the following detailed description of the instant invention.

This invention provides a method whereby the efficiency of recovery of relatively high-viscosity crude oils by water flooding is improved by increasing the viscosity of the flood water in such a manner that the injection rate is materially affected. In carrying out this invention a fluid system containing an amine is initially introduced into the oil sand containing the residual petroleum oils. When this solution is positioned in a zone remote from the injection well, wherein a substantial resistance to flow is not experienced, carbon dioxide gas is injected into the formation in an amount sufficient to react with substantially all of the injected amine and form an ammonium carbamate in situ. This carbamate will function to increase the viscosity of the portion of the flooding liquid at the forward end of the flood bank. After the thickened section of the flood bank has been formed, a conventional flooding technique is employed wherein ordinary flooding water is employed. Accordingly, between this water and the oil will be formed a bank of viscous carbamate solution which will sufficiently decrease the viscosity ratio of oil-to-water to enhance the efficiency of oil recovery by water flooding.

The substituted ammonium carbamates formed by passing carbon dioxide through an amine solution are water-soluble thickening agents which will effect a substantial increase in the viscosity of the water employed in the flood front. A variety of amines including aliphatic, alicyclic and aromatic amines will react with carbon dioxide to form the symmetrical, substituted ammonium carbamates employed in the process of this invention. The carbamates which are formed must be stable and not decompose in water at the formation conditions. In the preparation of the carbamates it is preferred that unsubstituted amines be employed; however, amines having substituent groups, such as carboxyl, carboxy, hydroxyl, halogen, etc., which will not interfere with the reaction between the carbon dioxide and the amine portion of the molecule can also be used. It is also preferred that water-soluble amines be used in order to facilitate the in situ preparation of the carbamate thickening agent. This, however, does not preclude the use of water-insoluble amines, which can be used in a dispersed state or dissolved in a coupling agent which will dissolve the amine to form a water-soluble solution, such as a water-soluble solution formed by dissolving normal octyl amine in dioxane and admixing the solution with water. Examples of amines which can be employed include ethyl amine, dimethyl amine, diethyl amine, methyl-ethyl amine, normal-octyl amine, benzyl amine, ethyl cyclohexyl amine, monoethanol amine, diethanol amine, etc.

The thickening effect of carbamates is shown by the following investigation:

(1) $CO_2$ was passed through 100 g. of an aqueous solution containing 40% dimethyl amine at the rate of 0.1 s.c.f.h. for 300 minutes at room temperature. The initial viscosity of the solution was about 1 centipoise. The dimethyl ammonium dimethyl carbamate produced increased the viscosity of the solution to 12 centipoises.

(2) Employing an aqueous system prepared by passing one cubic foot of $CO_2$ through a solution containing 144 g. of 1-methyloctylamine and 14 g. of isopropyl alcohol, a carbamate solution having a viscosity of 4 centipoises was produced. The initial viscosity of the amine-alcohol solution was about 1 centipoise. Similar increases in viscosity are also produced by incorporating in an aqueous solution various other carbamate thickening agents.

In carrying out the process of this invention a reservoir having the following properties:

| | |
|---|---|
| Oil viscosity | 50 centipoises. |
| Area | 5800 acres. |
| Average sand thickness | 25 ft. |
| Porosity | 21%. |
| Initial oil saturation | 50%. |
| Initial water saturation | 30%. |
| Oil in place | 118,000,000 bbls. | is treated. In accordance with this invention, 1,000,000 bbls. of a 40% solution of dimethyl amine in water are injected into the rock reservoir. Following the introduction of the amine solution 4,000,000 lbs. of gaseous carbon dioxide is passed through the amine solution. The chemical reaction between the injected amine and carbon dioxide results in the formation in situ of dimethyl ammonium dimethylcarbamate. The viscosity of the resultant water solution of carbamate is between 10 and 20 centipoises. Following the preparation of the flood front, ordinary flooding water at a pump pressure of about 500 pounds per square in. is injected into the reservoir. The bank of viscous carbamate solution between the ordinary flooding water and the reservoir oil, by decreasing the oil/water viscosity ratio, increases the efficiency of the flooding step, resulting in the recovery of a much higher percentage of oil than would be recovered employing ordinary flooding-water techniques.

In carrying out the instant invention conventional water-flooding practices can be employed. A variety of arrangements of injection and producing wells, such as the "five-spot" and "seven-spot" systems of flooding, can be used. In general, the amount of flooding front of increased viscosity which is produced in situ for use in increasing the efficiency of the water flooding operation will comprise about 1–10% of the pore volume of the formation being treated. It is preferred that sufficient amount of a substituted ammonium carbamate thickening agent be employed to produce a solution having a viscosity of over 10 centipoises at 20° C. at low to moderate concentrations of carbamate up to about 75% by weight. Although substantially stoichiometric amounts of reactants can be employed, it is preferred that an excess of carbon dioxide be passed through the amine solution. This will permit a further enhancement in the efficiency of the water flooding process by taking advantage of any collateral effects which the dissolved carbon dioxide in the flood front may produce. In addition, surface-active agents can be added to either the flood front or the water-flooding agent. Surface-active chemicals which influence the interfacial tension relationships in the formation include certain fatty amines, cationic fatty amine acetates and water-soluble, cationic, quaternary ammonium salts. In addition, non-ionic ethylene oxide condensation products also have been employed in this service.

Although it is preferred that the thickening agent employed in this invention be formed in situ in the radial zone removed from the well bore in order to avoid the deleterious effect of pressure drop through the radial section immediately adjacent the well bore, in the event that formations of relatively high permeability are being flooded this pressure drop may be of no concern. In these instances the thickening agent can be formed in the well bore and subsequently introduced into the rock reservoir to effect the water flooding of the residual oil from the partially depleted zones of higher permeability.

It is evident from the foregoing specific examples that a number of variations in manipulative techniques, amines employed, introduction of $CO_2$, etc., can be used without departing from the scope of this invention.

Accordingly, we claim as our invention:

1. A secondary recovery, water-flooding process for the recovery of residual petroleum oil from partially depleted reservoirs traversed by an injection well and a producing well which comprises introducing into said reservoir through said injection well an aqueous admixture containing at least one amine monomer selected from the group consisting of primary and secondary amines capable of reaction with carbon dioxide to form a substituted ammonium carbamate, passing gaseous carbon dioxide through said admixture in an amount sufficient to react with said amine to form a water-soluble, substituted ammonium carbamate which is stable at formation conditions, whereby the viscosity of said aqueous admixture is increased, and thereafter introducing unthickened water into said reservoir and forcing said aqueous admixture and water through said reservoir.

2. A secondary recovery, water-flooding process for the recovery of residual petroleum oil from partially depleted reservoirs traversed by an injection well and a producing well which comprises injecting through said injection well and into a zone of said reservoir remote from said injection well an aqueous admixture containing at least one amine selected from the group consisting of primary and secondary amines in which the substituent groups are selected from the group consisting of methyl and ethyl radicals, passing gaseous carbon dioxide through said admixture in an amount sufficient to react with said amine to form a water-soluble, substituted ammonium carbamate which is stable at formation conditions, whereby the viscosity of said aqueous admixture is increased, thereafter introducing unthickened water into said reservoir and forcing said aqueous admixture and water through said reservoir.

3. A process in accordance with claim 2 in which a volume of said aqueous admixture substantially equivalent to a volume within the range of about 1–10% of the pore volume of said reservoir is introduced therein.

4. A process in accordance with claim 2 in which said admixture contains dimethyl amine.

5. A process in accordance with claim 4 in which said dimethyl amine is present in an amount sufficient to provide a solution containing 10–60% of dimethyl ammonium dimethyl carbamate.

References Cited in the file of this patent

UNITED STATES PATENTS

| | | |
|---|---|---|
| 2,771,138 | Beeson | Nov. 20, 1956 |
| 2,827,964 | Sandiford et al. | Mar. 25, 1958 |
| 2,866,507 | Bond et al. | Dec. 30, 1958 |

OTHER REFERENCES

Werner: Chemical Society Journal, vol. 117, part II (Transactions), 1920, pp. 1046 to 1053.